US010587192B2

(12) United States Patent
Hallikainen

(10) Patent No.: US 10,587,192 B2
(45) Date of Patent: Mar. 10, 2020

(54) DC-DC VOLTAGE REDUCING CONVERTER WITH A TEST MODE OPERATION

(71) Applicant: NORDIC SEMICONDUCTOR ASA, Trondheim (NO)

(72) Inventor: Samuli Antti Hallikainen, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 16/333,206

(22) PCT Filed: Sep. 13, 2017

(86) PCT No.: PCT/GB2017/052700
§ 371 (c)(1),
(2) Date: Mar. 13, 2019

(87) PCT Pub. No.: WO2018/051086
PCT Pub. Date: Mar. 22, 2018

(65) Prior Publication Data
US 2019/0245440 A1 Aug. 8, 2019

(30) Foreign Application Priority Data
Sep. 14, 2016 (GB) .................................. 1615640.8

(51) Int. Cl.
*H02M 3/156* (2006.01)
*H02M 3/158* (2006.01)
*H02M 1/00* (2006.01)

(52) U.S. Cl.
CPC .......... *H02M 3/156* (2013.01); *H02M 3/158* (2013.01); *H02M 2001/0009* (2013.01); *H02M 2001/0035* (2013.01); *Y02B 70/16* (2013.01)

(58) Field of Classification Search
CPC ................. H02M 3/156; H02M 3/158; H02M 2001/0035; H02M 2001/0009
See application file for complete search history.

(56) References Cited

U.S. PATENT DOCUMENTS 9,093,899 B2  7/2015  Jayaraj et al.
2010/0188061 A1  7/2010  Ma et al.
(Continued)

OTHER PUBLICATIONS

International Search and Written Report for PCT/GB2017/052700, dated Nov. 29, 2017, 9 pages.
(Continued)

*Primary Examiner* — Yusef A Ahmed
*Assistant Examiner* — Shahzeb K Ahmad
(74) *Attorney, Agent, or Firm* — Klarquist Sparkman, LLP

(57) ABSTRACT

A voltage reducing circuit includes a power switch circuit portion having high-side and low-side field-effect-transistors connected at a switch node. The power switch circuit portion has an on-state wherein the high-side transistor is enabled and the low-side transistor is disabled and, vice versa, an off-state. An energy storage circuit portion including an inductor connected to the switch node is arranged to provide an output voltage. A timer determines a falltime duration required for the output voltage to fall to a threshold value. A controller switches the voltage reducing circuit between a first mode of operation in which a periodic pulse width modulated drive signal is applied to the high-side and low-side field-effect-transistors; and a second mode of operation in which a pulse is applied to the high-side and low-side field-effect-transistors only if the output voltage reaches the threshold value.

8 Claims, 4 Drawing Sheets

(56) References Cited

U.S. PATENT DOCUMENTS

| | | |
|---|---|---|
| 2012/0187928 A1 | 7/2012 | Parto et al. |
| 2012/0206947 A1 | 8/2012 | Height et al. |
| 2013/0063104 A1* | 3/2013 | Gibson ............... H02M 3/1588 323/271 |
| 2015/0084606 A1 | 3/2015 | Nakamura et al. |
| 2015/0381052 A1 | 12/2015 | Adragna et al. |
| 2018/0083535 A1* | 3/2018 | Ni ............................ G05F 1/56 |

OTHER PUBLICATIONS

Search Report under Section 17(5) for GB1615640.8, dated Feb. 17, 2017, 3 pages.

* cited by examiner

DC-DC VOLTAGE REDUCING CONVERTER WITH A TEST MODE OPERATION

CROSS REFERENCE TO RELATED APPLICATIONS

This is the U.S. National Stage of International Application No. PCT/GB2017/052700, filed Sep. 13, 2017, which was published in English under PCT Article 21(2), which in turn claims the benefit of Great Britain Application No. 1615640.8, filed Sep. 14, 2016.

The present invention relates to DC-DC converters, particularly although not exclusively DC-DC voltage reducers such as synchronous DC-DC buck converters.

Modern portable electronic devices are typically provided with a power source such as a battery that acts as a direct current (DC) power supply for the various electronic components within the device. However, typically these components will have different voltage requirements and so it is conventional for such devices to employ one or more DC-DC converters that step a nominal voltage associated with the power supply down to a voltage appropriate for the different electronic components. While this could be achieved by using a potential divider network (e.g. a series of resistors) to create a number of "taps" having different voltages, this is highly inefficient as energy is simply wasted as heat dissipated across the resistors.

One alternative arrangement known in the art per se is a buck converter. A buck converter circuit utilises an inductor-capacitor or "LC" circuit which is periodically connected to and disconnected from the power supply (e.g. by intermittently opening and closing a switch, typically implemented as a transistor referred to as the "high-side" transistor) by a driver in order to step down the voltage. This can be seen as an electrical equivalent to a mechanical flywheel, wherein energy is periodically input to the system to keep it outputting energy at a steady rate. The ratio of the output voltage to the input voltage can be adjusted by altering the duty cycle of a pulse width modulated (PWM) drive signal produced by the driver that is applied to the gate of the high-side transistor in order to open and close it.

A synchronous buck converter circuit replaces what is known as the "freewheeling" or "flyback" diode with a second transistor, often referred to as the "low-side" transistor. The driver then closes the low-side transistor when opening the high-side transistor and vice versa by applying appropriate PWM drive signals to the high- and low-side transistors to open and close them so as to intermittently couple the LC circuit to the input voltage. This improves the efficiency of the buck converter in exchange for increasing the bill of materials associated with the circuit. The efficiency of the DC-DC converter increases for increased output currents.

As well as the PWM mode described above, the DC-DC converter may be operated in a "burst" mode of operation in which the converter is run only for a short burst of time during an "active" phase and then switched off during an "idle" phase. The Applicant has appreciated that while the PWM mode is advantageous for higher output currents, the burst mode is advantageous for lower output currents.

When viewed from a first aspect, the present invention provides a voltage reducing circuit comprising:
  a power switch circuit portion comprising a high-side field-effect-transistor and a low-side field-effect-transistor arranged in series such that the drain terminals of each of said high-side and low-side transistors are connected at a switch node, the power switch circuit portion having an on-state wherein the high-side transistor is enabled and the low-side transistor is disabled, and an off-state wherein the high-side transistor is disabled and the low-side transistor is enabled;
  an input voltage connected across said high-side and low-side transistors;
  an energy storage circuit portion comprising an inductor, said energy storage circuit portion being connected to the switch node and arranged to provide an output voltage;
  a timer arranged to determine a falltime duration required for the output voltage to fall from an initial value associated with the on-state to a threshold value; and
  a controller arranged to switch the voltage reducing circuit between a first mode of operation in which a periodic pulse width modulated drive signal is applied to the high-side and low-side field-effect-transistors; and a second mode of operation in which a pulse is applied to the high-side and low-side field-effect-transistors only if the output voltage reaches the threshold value;
  wherein the controller is arranged to: compare the falltime duration to a threshold duration; and switch the voltage reducing circuit from the second mode to the first mode only if the falltime duration is less than the threshold duration.

Thus it will be appreciated by those skilled in the art that the present invention provides an improved voltage reducing circuit suitable for use as a DC-DC converter that can switch from a burst mode of operation to a PWM mode of operation if the output voltage falls faster than a particular rate (determined by the threshold duration). However, if operating in the burst mode requires applying the pulse too frequently (corresponding to the falltime duration being too short)—i.e. the idle phase of the burst mode is relatively short—the controller switches the voltage reducing circuit from the burst mode back to the PWM mode.

While the controller as described hereinabove is arranged to switch from the second (burst) mode of operation to the first (PWM) mode of operation, the controller may, in a set of embodiments, also be arranged to switch from the first mode to the second mode, for example in order to test whether the efficiency of the converter could be improved by switching to burst mode. The Applicant has appreciated that it is difficult to take measurements of the DC output current when running the voltage reducing circuit in the PWM mode. Furthermore, it is impossible to measure the DC output current during the burst mode. Accordingly in some embodiments, the controller is further arranged to carry out a test of the voltage reducing circuit, wherein the test comprises switching the voltage reducing circuit from the first mode to the second mode; comparing the falltime duration to a threshold duration; and switching the voltage reducing circuit back to the first mode only if the falltime duration is less than the threshold duration.

In such embodiments, the circuit typically operates in the PWM mode (i.e. the first mode) unless a test of the circuit indicates that it would be more efficient to switch the burst mode (i.e. the second mode). That is, if temporarily switching to the burst mode provides an improvement in efficiency, the voltage reducing circuit remains in the burst mode, but switches back if no such improvement is observed. This test may be carried out intermittently, e.g. in response to an external command or interrupt signal, or may be carried out periodically while the voltage reducing circuit is running in the first mode of operation.

While the voltage reducing circuit may operate in either the first mode or the second mode by default, in preferred embodiments the first mode is a default mode of the voltage reducing circuit.

Certain embodiments of the invention will now be described, by way of example only, with reference to the accompanying drawings in which.

Figure 1:
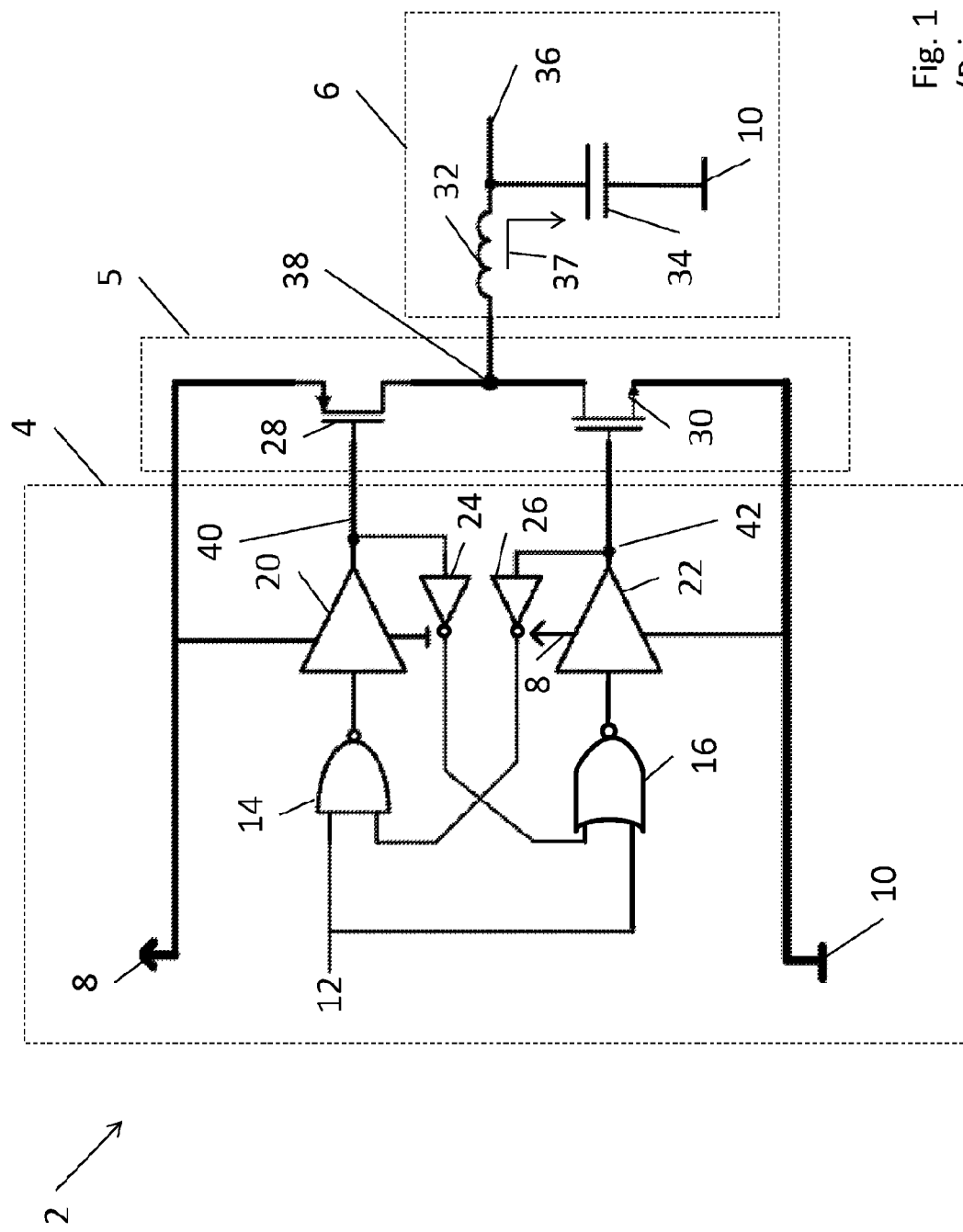
FIG. 1 shows a conventional synchronous DC-DC buck converter for reference purposes only.

FIG. 1 shows a conventional "non-overlapped" synchronous DC-DC buck converter 2. For ease of reference, the buck converter 2 shown in FIG. 1 has been divided up into a drive circuit portion 4, a power-switch circuit portion 5 and an energy storage circuit portion 6. The buck converter 2 is arranged to step an input voltage 8 down to an output voltage 36, and is operable in two modes. In the first, pulse width modulated (PWM) mode, the ratio of these two voltages 8, 36 is proportional to the duty cycle of a cyclical pulse width modulated (PWM) control signal 12 as will be explained below. The buck converter 2 can also be operated in a second, burst mode wherein the control signal 12 is only pulsed to its logic high value intermittently such that the buck converter 2 is operational only for a short burst of time during an "active" phase and then is otherwise switched off during an "idle" phase.

The drive circuit portion 4 includes a latch circuit constructed from a Boolean NAND gate 14 and a Boolean NOR gate 16, the outputs of which are fed into high-side and low-side driving amplifiers 20, 22 respectively. The output 40 of the high-side amplifier 20 (which takes the output of the NAND gate 14 as an input) is then coupled to an input of the NOR gate 16 via an inverter 24. Similarly, the output 42 of the low-side amplifier 22 (which takes the output of the NOR gate 16 as an input) is then coupled to an input of the NAND gate 14 via a further inverter 26. Each of the NAND and NOR gates 14, 16 has its other input coupled to the control signal 12.

The outputs of the high-side amplifier 20 and low-side amplifier 22 are applied to the gate terminals of a high-side p-channel field-effect-transistor (FET) 28 and an n-channel low-side field-effect-transistor (FET) 30 respectively. These high- and low-side FETs 28, 30 are arranged in series as a power-switch circuit portion 5, such that their respective drain terminals are connected at a switch node 38, to which the energy storage circuit portion 6 is connected as will be described in further detail below. The source terminal of the high-side FET 28 is connected to the input voltage 8 and the source terminal of the low-side FET 30 is connected to ground 10, i.e. the input voltage is connected across the power-switch circuit portion 5.

The energy storage circuit portion comprises an inductor-capacitor or "LC" resonant circuit, including an inductor 32 connected to the switch node 38 by one of its terminals. The other terminal of the inductor 32 is connected to one terminal of a capacitor 34, which in turn has its other terminal connected to ground 10. An output voltage is taken from an output node 36 situated between the inductor 32 and the capacitor 34.

Thus it will be seen that the latch circuit within the drive circuit portion 4 takes the control signal 12 and generates a pair of drive signals 40, 42 via the outputs of the high- and low-side amplifiers 20, 22 respectively. The two drive signals 40, 42 do not undergo transitions at the same time and so prevent both transistors 28, 30 being enabled at the same time. These drive signals 40, 42 cause the power-switch circuit portion 5 to switch between an on-state and an off-state either intermittently or periodically depending on which mode it is being operated in. In the on-state the high-side FET 28 is enabled and the low-side FET 30 is disabled, pulling the voltage at the switch node 38 up to the input voltage 8. In the off-state the high-side FET 28 is disabled and the low-side FET 30 is enabled, pulling the voltage at the switch node 38 down to ground 10. This switching between the on- and off-states of the power-switch circuit portion 5 causes the energy storage circuit portion 6 to be selectively coupled to and decoupled from the input voltage 8.

Generally, when the buck converter 2 is first switched on, the power-switch circuit portion 5 starts in the off-state and the current in the energy storage circuit portion 6 is zero. After the first positive transition in the control signal 12, the power-switch circuit portion 5 will be switched to the on-state and the current will increase in response. The inductor 32 will subsequently produce a voltage in response to the time-varying current. This voltage drop counteracts the voltage of the source and therefore reduces the voltage at the output 36. Over time, the rate of change of current decreases, and the voltage across the inductor 32 also decreases accordingly. This increases the voltage at the output 36. Throughout this process, the inductor 32 generates a magnetic field. If the power-switch circuit portion 5 is switched to the off-state (decoupling the energy storage circuit portion 6 from the input voltage 8) while the current is changing, there will necessarily always be a voltage drop across the inductor 32 and therefore the voltage at the output 36 will always be less than the input voltage 8.

When the buck converter 2 is operated in the PWM mode, it typically follows that the ratio of the output voltage 36 to the input voltage 8 is directly proportional to the duty cycle of the PWM control signal 12—i.e. if the duty cycle is 60%, the output voltage 36 will be 60% of the input voltage 8.

The operation of an ideal buck converter in the PWM mode is shown mathematically below with reference to Equations 1 to 10, wherein:

$V_L$ is the voltage across the inductor 32;
$V_i$ is the input voltage 8; $V_o$ is the output voltage 36;
L is the inductance of the inductor 32;
$I_L$ is the current through the inductor 32;
E is the energy stored in the inductor 32;
$t_{on}$ is the duration for which the switch circuit portion 5 is in the on-state;
$t_{off}$ is the duration for which the switch circuit portion 5 is in the off-state;
T is the total period of the voltage cycle at the switch node 38; D is the duty cycle of the voltage cycle at the switch node 38;
$\Delta I_{L_{on}}$ is the change in current while the switch circuit portion 5 is in the on-state; and
$\Delta I_{L_{off}}$ is the change in current while the switch circuit portion 5 is in the off-state.

Firstly, from Kirchhoff's voltage law, during the on-state the voltage $V_L$ across the inductor 32 must be the same as the difference between the input voltage 8 ($V_i$) and the output voltage 36 ($V_o$) as per Eq. 1:

$$V_L = V_i - V_o$$

Equation 1: Voltage across the inductor 32 while switch circuit portion 5 is in the on-state. The current through the inductor 32 will rise linearly during this time.

Similarly, during the off-state the voltage $V_L$ across the inductor 32 must be equal in magnitude to the output voltage 36 ($V_o$) but of the opposite sign as per Eq. 2:

$$V_L = -V_o$$

Equation 2: Voltage across the inductor 32 while switch circuit portion 5 is in the off-state. The current through the inductor 32 will decrease during this time.

The characteristic equation for the relationship between energy stored in the inductor 32 and the current therethrough is given below in Eq. 3:

$$E = \frac{LI_L^2}{2}$$

Equation 3: Energy stored in the inductor 32.

Thus it will be seen that the energy stored in the inductor 32 increases during the on-state as the current $I_L$ therethrough increases. Conversely, the energy stored in the inductor 32 decreases during the off-state as it is used to transfer energy to the output of the buck converter 2. The rate of change of the current $I_L$ through the inductor 32 is then related to the voltage $V_L$ across the inductor 32 as per Eq. 4:

$$V_L = L\frac{dI_L}{dt}$$

Equation 4: Characteristic voltage-current equation of the inductor 32.

Then by integrating Eq. 4 during the on-state, the total change in current during the on-state can be found as shown in Eq. 5:

$$\Delta I_{L_{on}} = \int_0^{t_{on}} \frac{V_L}{L} \cdot dt = \left(\frac{V_i - V_o}{L}\right)t_{on},$$

$$t_{on} = DT$$

Equation 5: Increase in current through the inductor during the on-state.

Similarly, by integrating Eq. 4 during the off-state, the total change in current during the off-state can be found as shown in Eq. 6:

$$\Delta I_{L_{off}} = \int_{t_{on}}^{T=t_{on}+t_{off}} \frac{V_L}{L} \cdot dt = \left(\frac{-V_o}{L}\right)t_{off},$$

$$t_{off} = (1-D)T$$

Equation 6: Decrease in current through the inductor during the on-state.

Assuming that the buck converter 2 operates in the steady state, the energy stored at the end of the period T must be equal to that at the beginning of the period.

$$\frac{V_i - V_o}{L}t_{on} - \frac{V_o}{L}t_{off} = 0$$

Equation 7: Steady state condition.

Since $t_{on}=DT$ and $t_{off}=(1-D)T$ as per Eqs. 5 and 6, these relationships can be substituted into Eq. 7 in order to obtain Eq. 8:

$$(V_i - V_o)DT - V_o(1-D)T = 0$$

Equation 8: Steady state condition.

Rearranging Eq. 8 further yields Eq. 9 below:

$$V_o - DV_i = 0$$

Equation 9: Steady state condition.

Which in turn yields Eq. 10 below, from which it can be seen how the ratio of the output voltage 36 ($V_o$) to the input voltage 8 ($V_i$) is directly proportional duty cycle D of the PWM control signal 12:

$$D = \frac{V_o}{V_i}$$

Equation 10: Relationship between input voltage and output voltage as a function of the duty cycle.

Figure 2:
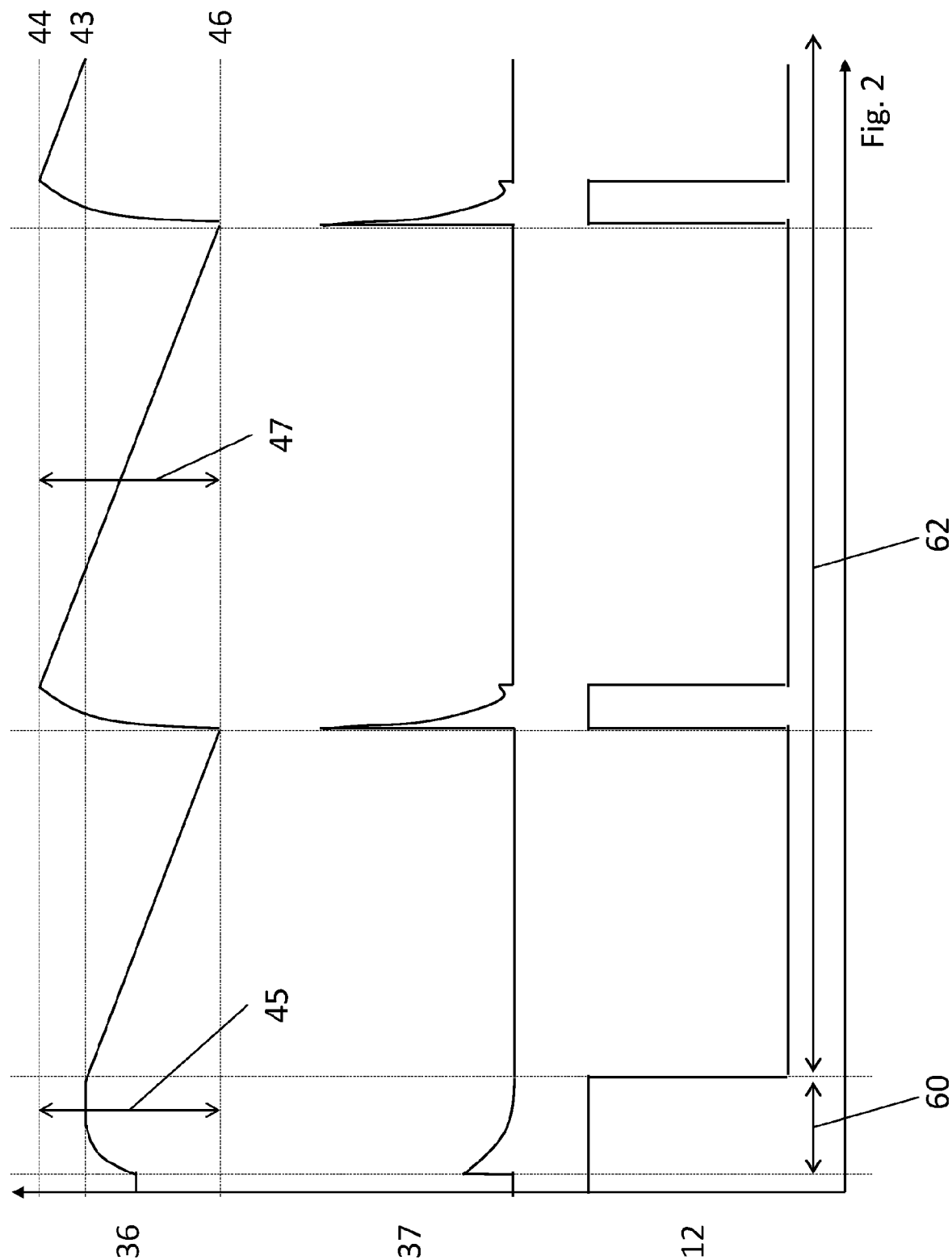
FIG. 2 shows a timing diagram illustrating the PWM and burst modes of the DC-DC buck converter shown in FIG. 1.

By way of contrast to the PWM mode 60 shown in FIG. 2, when the buck converter 2 is operated in the burst mode 62 the output voltage 36 is permitted to vary between an upper threshold 44 and a lower threshold 46 with a ripple 47 as shown in FIG. 2. It will of course be understood that the "upper threshold" 44 is not a limit that is used for a comparison but is merely the value that the output voltage 36 reaches when the energy storage circuit portion 6 is coupled to the input voltage 4. In the burst mode 62, the control signal 12 comprises short pulses which are applied intermittently which drive the output voltage 36 to the upper threshold 44. However, in the burst mode 62 the output voltage 36 is permitted to fall by a tolerable amount to the lower threshold 46. When this lower threshold 46 is reached, another pulse is applied in order to drive the output voltage 36 back to its upper threshold 44.

As can be seen from the graph shown in FIG. 2, the coil current 37 in the burst mode 62 experiences greater "spikes" than in the PWM mode 60 as the value of the output voltage 36 must be raised by a greater amount (i.e. by the ripple 47) with each rising edge in the burst mode 62 than in the PWM mode 60.

Figure 3:
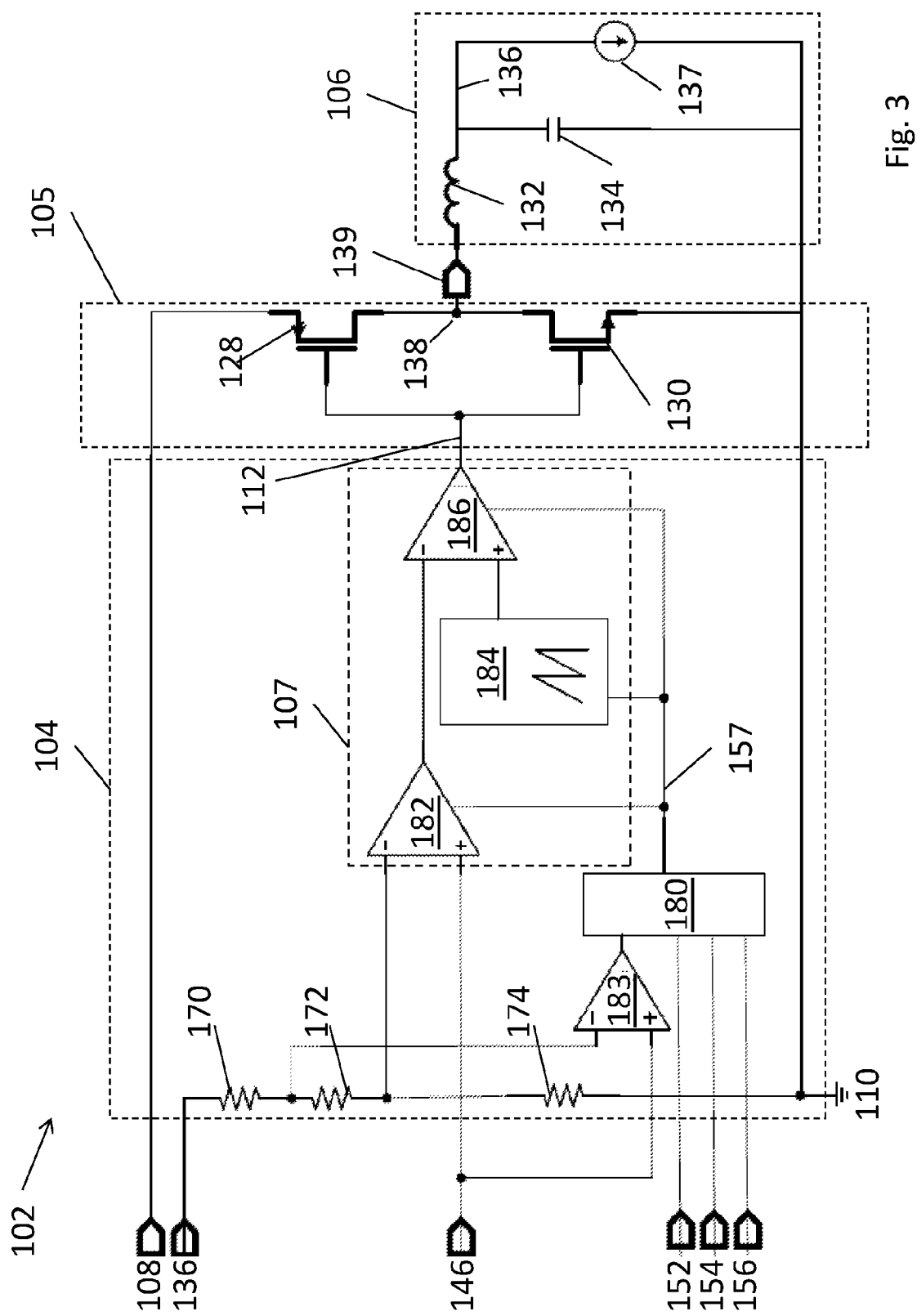
FIG. 3 shows a synchronous DC-DC buck converter in accordance with an exemplary embodiment of the present invention.

FIG. 3 shows a voltage reducing circuit 102 in accordance with an exemplary embodiment of the present invention, arranged to switch automatically between the burst and PWM modes. As with the voltage reducing circuit 2 of FIG. 1, the buck converter 102 shown in FIG. 3 comprises a high-side p-channel field-effect-transistor (FET) 128 and an n-channel low-side field-effect-transistor (FET) 130. These high- and low-side FETs 128, 130 are arranged in series as a power-switch circuit portion 105, such that their respective drain terminals are connected at a switch node 138, to which the energy storage circuit portion 106 is connected as will be described in further detail below. The source terminal of the high-side FET 128 is connected to the input voltage 108 and the source terminal of the low-side FET 130 is connected to ground 110, i.e. the input voltage 108 is connected across the power-switch circuit portion 105.

The energy storage circuit portion 106 comprises an inductor-capacitor or "LC" filter circuit, including an inductor 132 connected to the switch node 138 by one of its terminals. The other terminal of the inductor 132 is connected to one terminal of a capacitor 134, which in turn has its other terminal connected to ground 110. An output voltage 136 is taken from an output node situated between the inductor 132 and the capacitor 134. A load current 137 that flows through the energy storage is depicted by a current source on the Figure.

The power switch circuit portion 105 is driven by a controller circuit portion 104 which is arranged to switch the voltage reducing circuit 102 between its PWM mode and its burst mode. The gate terminals of the high- and low-side FETs 128, 130 are connected to the output of a PWM controller 107. The PWM controller 107 comprises a pulse generating comparator 186 which is arranged to provide a control signal 112 which couples and decouples the energy storage circuit portion 106 to and from the input voltage 108. This comparator 186 compares the voltages generated by a saw-wave generator 184 and an error amplifier 182, the operation of each of which is detailed below.

A potential divider network made up of three resistors 170, 172, 174 is arranged to scale down the output voltage 136 produced by the energy storage circuit portion 106 to values suitable for input to the error amplifier 182 and a second comparator 183. Both the error amplifier 182 and the comparator 183 are arranged to compare a voltage proportional to the output voltage 136 to a reference voltage which is set to a lower threshold 146—i.e. the voltage at which a pulse is required on the control signal 112 in the burst mode 162. The error amplifier 182 produces an output proportional to the difference between its input voltages while the comparator 183 produces a binary output indicating which of its two input voltages is larger.

The binary output of the second comparator 183 is input to a burst timer logic circuit 180, which also takes as inputs: a PWM mode enable signal 152; a burst mode enable signal 154; and a clock signal 156. The burst timer logic circuit 180 is arranged to produce an enable signal 157 which is applied to the error amplifier 182, saw-wave generator 184, and the comparator 186 in order to selectively enable and disable the PWM controller 107 as required. Specifically, in the PWM mode of operation, the burst timer logic circuit 180 sets the enable signal 157 to logic high at all times such that the PWM controller 107 constantly produces PWM signals to be applied to the power switch circuit portion 105. However, in the burst mode of operation, the burst timer logic circuit 180 toggles the PWM controller 107 intermittently so as to produce the required pulses each time the comparator 183 indicates that the lower threshold 146 has been reached.

Figure 4:
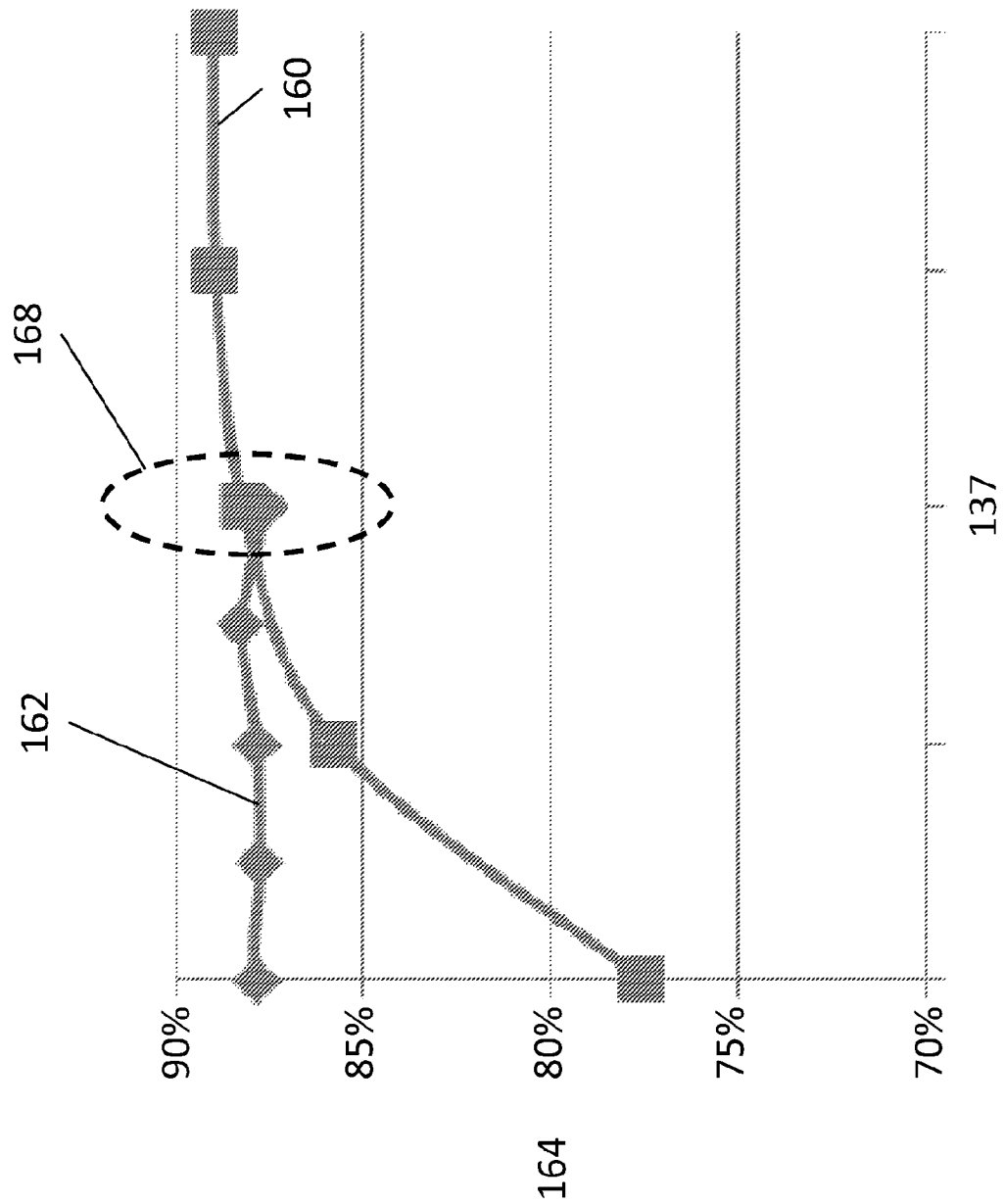
FIG. 4 shows a graph illustrating the ideal operating point of the buck converter of FIG. 3.

FIG. 4 shows a graph illustrating the ideal operating point of the voltage reducing circuit 102 of FIG. 3. The graph shown in FIG. 4 shows the percentage DC-DC efficiency 164 of the voltage reducing circuit 102 as a function of load current 137 for both the PWM mode of operation 160 and the burst mode of operation 162. As can be seen from the graph, the PWM mode 160 is more efficient at higher load currents while the burst mode 162 is more efficient at lower load currents. The ideal operation point 168 for the automatic switchover between the modes 160, 162 is the point at which the efficiency curves are "smooth"—i.e. switching between the modes 160, 162 at this point causes no noticeable change in efficiency.

If the circuit 102 is operated in the burst mode 162 at any higher a load current 137 than the operating point 168, the duration it takes for the output voltage 136 to fall below the lower threshold becomes too short, such that bursts must be applied so often that it would be more efficient to switch to the PWM mode 160. Conversely, if the circuit 102 is operated in the PWM mode 160 at any lower a load current 137 than the operating point 168, the duration it takes for the output voltage 136 to fall below the lower threshold becomes so long that it does not fall below the threshold before the next pulse is applied and thus it would be more efficient to switch to the burst mode 162. This may be determined by temporarily switching to burst mode 162 in order to test how long it takes for the output voltage 136 to fall below the lower threshold (and then either switching back to PWM mode 160 if the falltime is not excessive or remaining in burst mode 162 if it is). This temporary switching may be carried out using additional control logic (not shown) or may be a function of the burst timer logic 180 as appropriate. It will of course be appreciated that the circuit 102 may apply hysteresis such that the threshold load current for switching from the PWM mode to the burst mode differs from the threshold load current for switching from the burst mode to the PWM mode in order to prevent erratic switching between modes when operating close to the ideal operation point.

Thus it will be seen that the present invention provides a DC-DC voltage reducing circuit arranged to automatically switch between PWM and burst modes of operation in order to provide an increase in efficiency. It will be appreciated by those skilled in the art that the embodiments described above are merely exemplary and are not limiting on the scope of the invention.

The invention claimed is:

1. A voltage reducing circuit comprising:
    a power switch circuit portion comprising a high-side field-effect-transistor and a low-side field-effect-transistor arranged in series such that drain terminals of each of said high-side and low-side transistors are connected at a switch node, the power switch circuit portion having an on-state wherein the high-side transistor is enabled and the low-side transistor is disabled, and an off-state wherein the high-side transistor is disabled and the low-side transistor is enabled;
    an input voltage connected across said high-side and low-side transistors;
    an energy storage circuit portion comprising an inductor, said energy storage circuit portion being connected to the switch node and arranged to provide an output voltage;
    a timer arranged to determine a falltime duration required for the output voltage to fall from an initial value associated with the on-state to a threshold value; and
    a controller arranged to switch the voltage reducing circuit between a first mode of operation in which a periodic pulse width modulated drive signal is applied to the high-side and low-side field-effect-transistors; and a second mode of operation in which a pulse is applied to the high-side and low-side field-effect-transistors only if the output voltage reaches the threshold value;
    wherein the controller is arranged to:
        compare the falltime duration to a threshold duration;
        switch the voltage reducing circuit from the second mode to the first mode only if the falltime duration is less than the threshold duration; and
    carry out a test of the voltage reducing circuit, wherein the test comprises switching the voltage reducing circuit from the first mode to the second mode; comparing the falltime duration to a threshold duration; and switching the voltage reducing circuit back to the first mode only if the falltime duration is less than the threshold duration, wherein the test is carried out in response to an interrupt signal.

2. The voltage reducing circuit as claimed in claim 1, wherein the controller is further arranged to switch from the first mode to the second mode.

3. The voltage reducing circuit as claimed in claim 1, wherein the test is carried out periodically while the voltage reducing circuit is running in the first mode of operation.

4. The voltage reducing circuit as claimed in claim 1, wherein the first mode is a default mode of the voltage reducing circuit.

5. A voltage reducing circuit comprising:
  a power switch circuit portion comprising a high-side field-effect-transistor and a low-side field-effect-transistor arranged in series such that drain terminals of each of said high-side and low-side transistors are connected at a switch node, the power switch circuit portion having an on-state wherein the high-side transistor is enabled and the low-side transistor is disabled, and an off-state wherein the high-side transistor is disabled and the low-side transistor is enabled;
  an input voltage connected across said high-side and low-side transistors;
  an energy storage circuit portion comprising an inductor, said energy storage circuit portion being connected to the switch node and arranged to provide an output voltage;
  a timer arranged to determine a falltime duration required for the output voltage to fall from an initial value associated with the on-state to a threshold value; and
  a controller arranged to switch the voltage reducing circuit between a first mode of operation in which a periodic pulse width modulated drive signal is applied to the high-side and low-side field-effect-transistors; and a second mode of operation in which a pulse is applied to the high-side and low-side field-effect-transistors only if the output voltage reaches the threshold value;
  wherein the controller is arranged to:
    compare the falltime duration to a threshold duration;
    switch the voltage reducing circuit from the second mode to the first mode only if the falltime duration is less than the threshold duration; and
  carry out a test of the voltage reducing circuit, wherein the test comprises switching the voltage reducing circuit from the first mode to the second mode; comparing the falltime duration to a threshold duration; and switching the voltage reducing circuit back to the first mode only if the falltime duration is less than the threshold duration, wherein the test is carried out periodically while the voltage reducing circuit is running in the first mode of operation.

6. The voltage reducing circuit as claimed in claim 5, wherein the controller is further arranged to switch from the first mode to the second mode.

7. The voltage reducing circuit as claimed in claim 5, wherein the test is carried out in response to an interrupt signal.

8. The voltage reducing circuit as claimed in claim 5, wherein the first mode is a default mode of the voltage reducing circuit.

* * * * *